United States Patent [19]
Choi

[11] Patent Number: 5,557,101
[45] Date of Patent: Sep. 17, 1996

[54] REEL TABLE REVOLUTION DETECTOR FOR USE IN A VIDEO CASSETTE RECORDER

[75] Inventor: Jae-Kyu Choi, Kyongki-Do, Rep. of Korea

[73] Assignee: Daewoo Electronics Co., Ltd., Seoul, Rep. of Korea

[21] Appl. No.: 119,338

[22] Filed: Sep. 9, 1993

[30] Foreign Application Priority Data

Sep. 9, 1992 [KR] Rep. of Korea ................. 92-17190

[51] Int. Cl.$^6$ ................. G01D 5/34; H01J 3/14
[52] U.S. Cl. ................. 250/231.13; 250/237 G
[58] Field of Search ................. 250/231.14, 231.13, 250/237 G, 229, 237 R; 356/375; 33/707

[56] References Cited

U.S. PATENT DOCUMENTS 5,061,848  10/1991  Choi ........................................ 250/229

FOREIGN PATENT DOCUMENTS 177020   7/1988   Japan ................. 250/231.13
175722   7/1988   Japan ................. 250/231.13
175725   7/1988   Japan ................. 250/231.13
2223575  11/1990  United Kingdom ..... 250/231.13

Primary Examiner—William L. Sikes
Assistant Examiner—Tiep H. Nguyen
Attorney, Agent, or Firm—William F. Pinsak

[57] ABSTRACT

The detector comprises a disc-like reel table adapted to support a tape reel thereon, the reel table having a reflective underneath surface and an array of concentric spaced-apart cutouts uniformly disposed on the reflective surface along a common imaginary circle whose center coincides with a rotational axis of the tape reel, each of the cutouts having a light scattering surface capable of reducing the intensity of a light beam incident thereupon to an appreciable level. A light emitter is located in an opposing relationship with respect to the reel table for projecting the light beam toward the reflective underneath surface and the light scattering surface of the reel table. Positioned adjacent to the light emitter is a light receiver for receiving the light beam reflected back from the reel table to produce a pulse signal when the intensity of the received light beam varies over time in a pulse pattern.

4 Claims, 2 Drawing Sheets

REEL TABLE REVOLUTION DETECTOR FOR USE IN A VIDEO CASSETTE RECORDER

FIELD OF THE INVENTION

The present invention generally relates to a video cassette recorder and, more particularly, to a reel table revolution detector for use in a video cassette recorder that has the ability to determine whether the reel table is under rotation or not.

DESCRIPTION OF THE PRIOR ART

As schematically shown in FIG. 1, the conventional video cassette recorder, usually referred to as "VCR" by its acronym, includes a deck or main frame 10 on which a reel drive unit 12 is mounted to cause rotation of the supply reel or the take-up reel of a tape cassette 14. Rotatably affixed to the main frame 10 with an appropriate spacing from the reel drive unit 12 is a head drum 16 that serves to record and reproduce a video signal on and from a magnetic tape.

The magnetic tape may be stretched out of the tape cassette 14 and then brought into contact with the head drum 16 by a pair of so-called pole bases 18 which are designed to slide along curvilinear guide slots 20. In the vicinity of the head drum 16 and along the tape movement path, there are provided an impedence roller 22 that ensures stable running of the magnetic tape and an erasure head 24 that serves to optionally erase the video signal recorded on the magnetic tape. As best illustrated in FIG. 2, the reel drive unit 12 comprises a capstan motor 26, a first reel table 28 adapted to rotatably support the supply reel of the tape cassette, a second reel table 30 spaced apart from the first reel table 28 to rotatably support the take-up reel of the tape cassettte and a switchable idler gear train 32 which may transmit the rotational force of the capstan motor 26 to either of the reel tables 28 and 30.

FIGS. 3 and 4 show a typical example of the prior art reel table 28 which is rotatable about a vertical pin 34 fixedly secured to the main frame 10. Whether the reel table 28 is under rotation or kept stationary can be detected by a reel table revolution detector. The revolution detector includes a light collision plate 36 fixedly attached to the underneath surface of the reel table 28 and a photosensor 38 mounted on the main frame 10 in an opposing relationship with respect to the light collision plate 36.

As clearly shown in FIG. 4, the light collision plate 38 consists of alternately disposed light reflection zones 40 and light absorption zones 42. The photosensor 38 includes a light emitter 44 that may project a light beam toward the light collision plate 36 and a light receiver 46 that may receive the light beam reflected from the light collision plate 36. When the intensity of the received light beam fluctuates over time, the light receiver 46 produces a pulse signal indicative of the reel table revolution which is fed to a control circuit of the video cassette recorder.

In addition to the prior art reel table revolution detector shown in FIGS. 3 and 4, Japanese Patent Publication No. 4-39140 discloses a revolution detector of the type which comprises a slip gear, a reel gear located immediately below the slip gear, the reel gear having an array of uniformly spaced concentrical apertures formed therethrough, and a photosensor disposed in a spaced opposing relationship with the reel gear to project and receive a light beam. The photosensor is adapted to produce a pulse signal indicative of the reel table revolution when the intensity of the recieved light beam varies over time.

Although the reel table revolution detectors described above may successfully carry out the task of detecting the rotation of the reel table, they require a separate light collision plate or its equivalent to modulate the intensity of the light beam. This tends to make the reel table complicated in structure and to increase the cost of manufacturing the video cassette recorder. Moreover, it is highly likely that the light collision plate may be broken off from the reel table during its service time, particularly where it is adhesively bonded to the reel table.

SUMMARY OF THE INVENTION

Accordingly, it is an object of the invention to provide a reel table revolution detector that has the capability of eliminating the afore-mentioned drawbacks inherent in the prior art reel table revolution detectors.

Another object of the invention is to provide a reel table revolution detector which is simple in structure, easy to manufacture and reliably operable for an extended period of service time.

In accordance with the present invention, there is provided a reel table revolution detector which comprises a disc-like reel table adapted to support a tape reel thereon, the reel table having a reflective underneath surface and an array of concentric spaced-apart cutouts uniformly disposed on the reflective surface along a common imaginary circle whose center coincides with a rotational axis of the tape reel, each of the cutouts having a light scattering surface capable of reducing intensity of a light beam incident thereupon to an appreciable level. A light emitter is located in an opposing relationship with respect to the reel table for projecting the light beam toward the reflective underneath surface and the light scattering surface of the reel table. Positioned adjacent to the light emitter is a light receiver for receiving the light beam reflected back from the reel table to produce a pulse signal when the intensity of the received light beam varies over time in a pulse pattern.

BRIEF DESCRIPTION OF THE DRAWINGS

The above and other objects and features of the instant invention will become apparent from the following description of the preferred embodiments given in conjunction with the accompanying drawings in which.

DETAILED DESCRIPTION OF THE PREFERRED EMBODIMENTS

Figure 1:
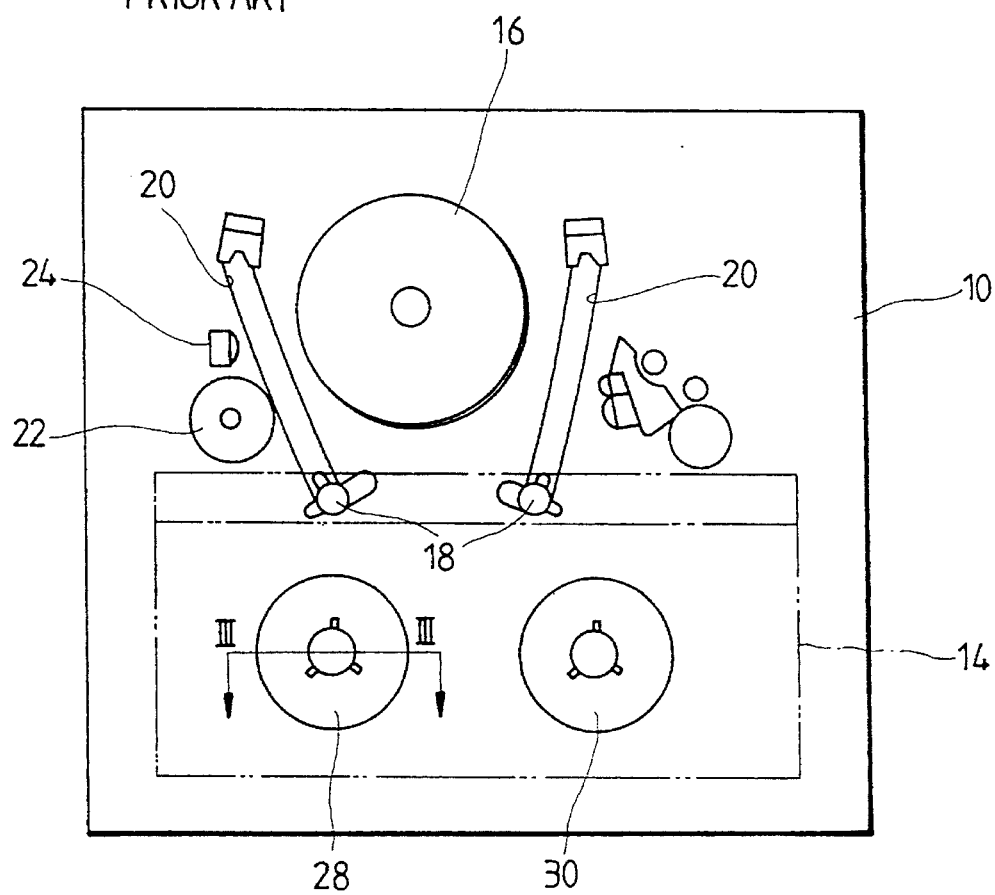
FIG. 1 is a schematic top view of the main frame and certain essential components of the prior art video cassette recorder, with the tape cassette illustrated in a phantom line.

The present invention will now be described in detail with reference to FIGS. 5 through 9 wherein like parts or components are designated by like reference numerals.

Figure 2:
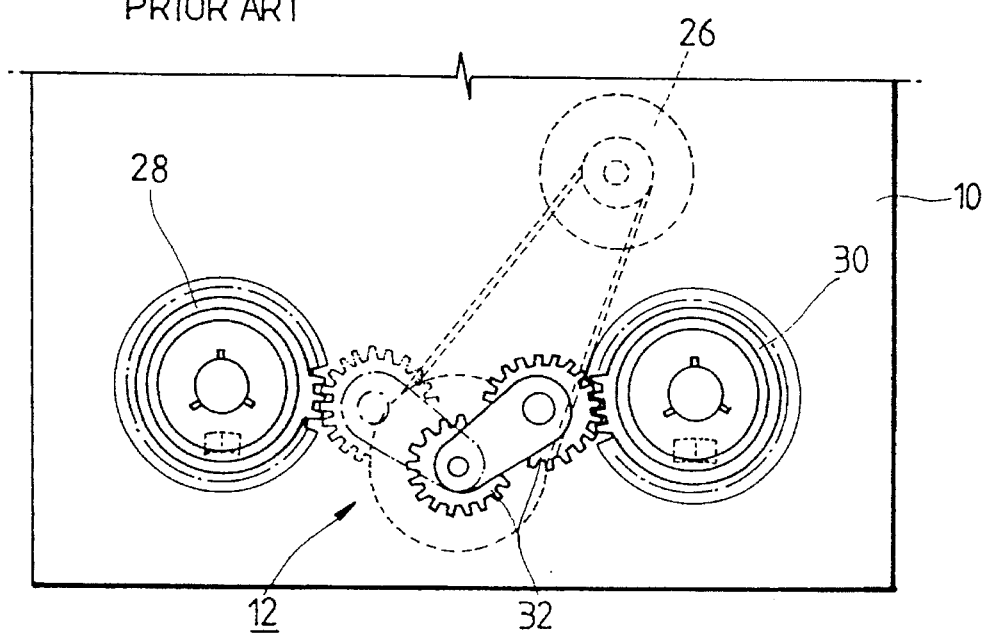
FIG. 2 shows, on an enlarged scale, the reel table drive unit usually employed in the conventional video cassette recorder.
Figure 3:
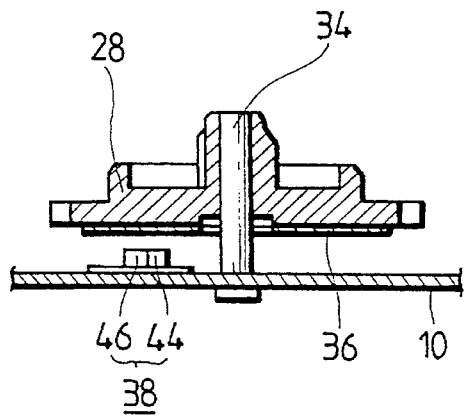
FIG. 3 is a sectional view taken along line III—III of FIG. 1, showing the prior art reel table revolution detector.
Figure 4:
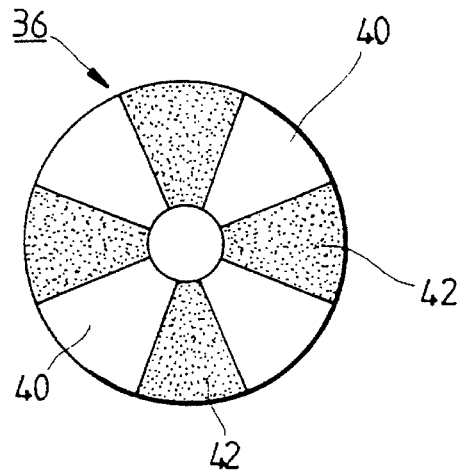
FIG. 4 illustrates the light collision plate fixedly secured to the reel table shown in FIG. 3.
Figure 5:
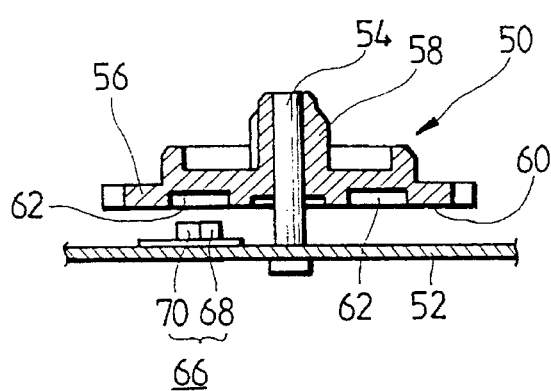
FIG. 5 shows, in cross-section, the reel table revolution detector in accordance with the present invention.

Referring first to FIG. 5, it can be seen that a disc-like reel table 50 is rotatably mounted on a main frame 52 of the video cassette recorder by means of a vertically extending post 54 whose proximal end is fixedly secured to the main frame 52. The reel table 50 serves to support and rotate either the supply reel or the take-up reel of a video tape cassette (not shown). To ensure that the rotational force of a capstan motor (see FIG. 2) be transmitted to the tape reel, the reel table 50 is provided with, at its periphery, a toothed flange 56 which is operatively connected to the capstan motor and, at its central region, a splined reel drive shaft 58 which may slidably engage with the hub of the tape reel.

Figure 6:
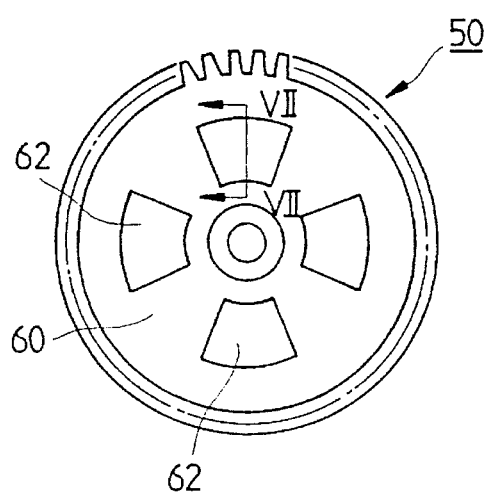
FIG. 6 is a bottom view of the reel table which shows the concentric cutouts disposed on the underneath surface of the reel table.
Figure 7:
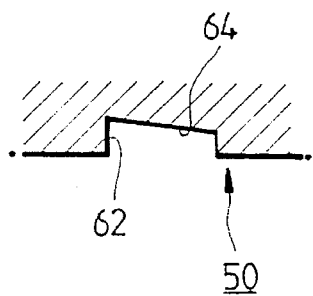
FIG. 7 is a sectional view taken along line VII—VII of FIG. 6, showing the light scattering surface defined in the respective cutouts.

As shown in FIGS. 5 and 6, the reel table 50 has a reflective underneath surface 60 at the opposite side of the reel drive shaft 58 and an array of concentric spaced-apart cutouts 62 substantially uniformly disposed on the reflective surface 60 along a common imaginary circle whose center coincides with a rotational axis of the tape reel. As used herein, the term "reflective surface" is intended to mean a smooth, planar surface which has the ability to reflect a light beam at the same angle as the incident angle of the light beam without significantly reducing or weakening the intensity of the light beam.

Figure 8:
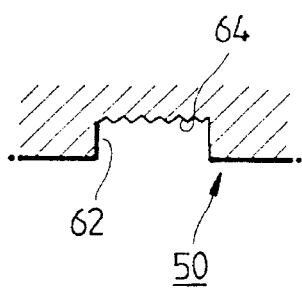
FIGS. 8 and 9 are sectional views similar to FIG. 7 but illustrating modified examples of the light scattering surface.
Figure 9:
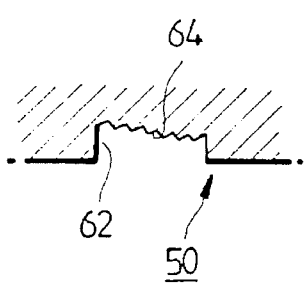

Each of the cutouts 62 has a light scattering surface 64 which may be either generally coplanar with the reflective surface 60 or axially offset a predetermined distance from the reflective surface 60. It should be appreciated that the term "light scattering surface" refers to an inclined or non-smooth surface capable of causing the light beam to reflect in a random direction and thereby reducing the intensity of the light beam incident thereupon to an appreciable level. In the embodiment shown in FIG. 7, the light scattering surface 64 is inclined or canted with respect to the reflective surface 60 so that the light beam may reflect at an angle which differs from the incident angle thereof. A modified example of the light scattering surface 64 is illustrated in FIG. 8, wherein a non-smooth irregular surface is employed to cause the light beam to reflect in a random direction, thereby reducing the intensity of the light beam reflected back therefrom. To reduce the intensity of the light beam to a great extent, it is desirable to combine the inclined surface of FIG. 7 and the irregular surface of FIG. 8 so as to provide another modification of the light scattering surface 64 as depicted in FIG. 9.

Turning back to FIGS. 5 and 6, the cutouts 62 are preferably disposed in such a spacing that leaves therebetween alternate light reflection regions of substantially the same width as that of the cutouts 62. Although the cutouts 62 are shown to have a generally sector-like configuration, it should be understood that the shape of the cutouts 62 is not critical in the present invention and, therefore, may be changed to, e.g., a circular or rectangular configuration. Likewise, the number of the cutouts 62 is a matter of designer's choice.

Referring again to FIG. 5, a photosensor 66 is mounted on the main frame 52, which consists of a light emitter 68 and a light receiver 70. The light emitter 68 is located in an opposing relationship with respect to the reel table 50 for projecting a light beam toward the reel table 50. Positioned adjacent to the light emitter 68 is the light receiver 70 for receiving the light beam reflected back from the reel table 50 to produce a pulse signal when the intensity of the received light beam fluctuates over time in a pulse pattern.

In operation, if the reel table 50 remains stationary, the light beam projected from the light emitter 68 will land over either the reflective surface 60 or the light scattering surface 64. As a result, the light receiver 70 will receive a fixed intensity of light beam, i.e., either the high inensity light beam from the reflective surface 60 or the low intensity light beam from the light scattering surface 64. This means that the light receiver 70 will generate a non-pulse signal indicating that the reel table 50 is kept stationary. In contrast, if the reel table 50 is subject to a rotational movement, the light beam projected from the light emitter 68 will land over both the reflective surface 60 and the light scattering surface 64 in an alternate fashion. Accordingly, the light receiver 70 will receive alternate high and low intensity light beams to produce a pulse signal indicating that the reel table 50 is under rotation.

While the present invention has been shown and described with reference to the particular embodiments, it will be apparent to those skilled in the art that many changes and modifications may be made without departing from the spirit and scope of the invention as defined in the appended claims.

What is claimed is:

1. A reel table revolution detector for use in a video cassette recorder, comprising:

a disc-like table adapted to rotatably support a tape reel thereon, said reel table having a reflective underneath surface and an array of concentric spaced-apart cutouts uniformly disposed on the reflective surface along a common imaginary circle whose center coincides with a rotational axis of the tape reel, each of said cutouts having a light scattering surface capable of reducing the intensity of a light beam incident thereupon to an appreciable level, wherein said light scattering surface is axially offset a predetermined distance from the reflective underneath surface of the reel table and wherein said cutouts are disposed in a spacing that accomodates therein alternate light reflection regions of substantially the same width as that of the cutouts;

a light emitter located in an opposing relationship with respect to the reel table for projecting the light beam toward the reflective underneath surface and the light scattering surface of the reel table; and a light receiver positioned adjacent to the light emitter for receiving the light beam reflected back from the reel table to produce a pulse signal when the intensity of the received light beam fluctuates over time in a pulse pattern.

2. The reel table revolution detector as recited in claim 1, wherein said light scattering surface is canted with respect to the reflective surface at an angle to direct the light beam away from the light receiver.

3. The reel table revolution detector as recited in claim 2, wherein said canted light scattering surface comprises an irregular surface inclined with respect to the reflective surface.

4. The reel table revolution detector as recited in claim 1, wherein said light scattering surface comprises an irregular surface lying in parallel with the reflective surface.

* * * * *